United States Patent Office 3,741,927
Patented June 26, 1973

3,741,927
TREAD STRIPS FOR TIRES FORMED OF HOMOPOLYMERS OF BUTADIENE
Karl-Heinz Nordsiek, Neithart Sommer, and Helmut Schwesig, Marl, Germany, assignors to Chemische Werke Huls Aktiengesellschaft, Marl, Germany
No Drawing. Filed Nov. 24, 1970, Ser. No. 92,537
Claims priority, application Germany, Nov. 29, 1969, P 19 60 065.8
Int. Cl. C08f 45/08, 45/28
U.S. Cl. 260—33.6 AQ
15 Claims

ABSTRACT OF THE DISCLOSURE

Tire tread strips for automobile tires having a good combination of wear and skid resistance are formed of a polybutadiene homopolymer composition consisting essentially of:
(a) a homopolymer of 1,3-butadiene having an average vinyl group content of 25–50%, a cis-1,4-double bond content of 10–40%, a trans-1,4-double bond content of 15–55%, a Mooney viscosity (ML–4) of between 40 and 120, and a deformation-elasticity of at least 25, whose vinyl groups are distributed along the longitudinal axis of the macromolecule toward an end thereof in a substantially decreasing manner;
(b) 5–100 parts by weight of a plasticizer, based on 100 parts by weight of polybutadiene; and
(c) 30–120 parts by weight of a carbon black, based on 100 parts by weight of polybutadiene.

BACKGROUND OF THE INVENTION

This invention relates to tread strips for tires, more particularly tread strips formed from homopolymers of butadiene, and to a process for the manufacture thereof.

Automobile tire treads consist of vulcanizates of rubber blends filled with large amounts of oil and carbon black. Heretofore, the rubber blends employed were mixtures of copolymers of butadiene and styrene with stereoregular polydiolefins, preferably cis-1,4-polybutadiene, produced by emulsion or solution polymerization. The ratio of the blend normally varies between 0.20 and 50:50. If the proportion of stereospecific polydiolefins is increased, the wearing ability of the tire is enhanced. However, the skid resistance on wet surfaces is impaired to the same degree. Because of this fact, a compromise between the aforementioned properties must necessarily be made in order to produce tires having acceptable performance properties.

Another obstacle to the use of the homopolybutadienes exclusively in tire treads is the poor processing properties of such rubbers. Therefore, due to the lack of suitable polymers combining the above-mentioned combination of properties, it was necessary to resort to the above-mentioned rubber blends and to vary the composition of such blends to meet various requirements. The use of such blends necessitates more expensive manufacturing conditions. Furthermore, other difficulties are encountered which often result from the fact that it is difficult to obtain homogeneous distributions of the components employed in the blend.

Therefore, there existed in the art, in view of the expense involved in the manufacture of these blends, considerable interest in the discovery of novel polymers meeting all the requirements for use in tire treads and additionally providing substantial technical and, in particular, economic manufacture and processing advantages.

Solution copolymers of butadiene and styrene have been developed which, due to their stereospecific molecular structure, are superior to the conventional emulsion copolymers with respect to wearing ability. Such copolymers, although their combination of properties closely approach the ideal, employ lithium catalysts in their production and measures must be taken, primarily in order to avoid the formation of block polymers, which are expensive from a processing point of view, and thus renders doubtful their economical use as tire tread raw material.

As set forth in the copending application of Neithart Sommer et al., Ser. No. 92,259, filed Nov. 23, 1970 (Attorneys' Docket No. Huels 214), entiled "Organolithium-Lewis Base Polymerization of 1,3-Butadiene and Novel Polybutadienes Thus Produced," homopolymers of butadiene having a vinyl content which varies substantially and decreasingly along the longitudinal axis of the macromolecule toward an end thereof are produced by conducting an organolithium-Lewis base catalyzed polymerization at a substantially constantly increasing polymerization temperature throughout the polymerization.

It has now been found that the above-described disadvantages are avoided in a surprising and advantageous manner by employing in the manufacture of tire tread strips, especially automobile tire tread strips, polybutadiene homopolymers which are the subject of the above-described application of Neithart Sommer et al.

SUMMARY OF THE INVENTION

According to this invention, tire treads are formed from a polybutadiene homopolymer composition consisting essentially of:
(a) A homopolymer of 1,3-butadiene having an average vinyl group content of 25–50%, a cis-1,4-double bond content of 10–40%; a trans-1,4-double bond content of 15–55%, a Mooney viscosity (ML–4) of between 40 and 120, and a deformation-elasticity of at least 25, whose vinyl groups are distributed along the longitudinal axis of the macromolecule toward an end thereof in a substantially decreasing manner;
(b) 5–100 parts by weight of a plasticizer, based on 100 parts by weight of polybutadiene; and
(c) 30–120 parts by weight of a carbon black, based on 100 parts by weight of polybutadiene.

DETAILED DISCUSSION

The polybutadienes employed in the production of the vulcanizates of this invention are produced employing a catalyst system consisting essentially of an organolithium compound and a Lewis base in an inert diluent at a substantially constantly increasing polymerization temperature.

Examples of suitable organolithium compounds are the alkyllithiums, e.g., methyllithium, ethyllithiums, n-, sec.-, and tert.-butyllithium, amyllithium, aryllithiums, e.g., phenyllithium, and cycloalkyllithiums, e.g., cyclohexyllithium. The organolithium compounds are usually employed in amounts of 0.01–0.1% by weight, preferably 0.02–0.05% by weight, based on butadiene.

Suitable Lewis bases are ethers, e.g., of one of the formulae R—O—R' and R—O—R'—O—R' wherein R and R', which can be alike or different, are aliphatic, preferably alkyl, groups of 1–20 carbon atoms or aromatic, preferably aryl, groups of 6–14 carbon atoms and R' is a bridging difunctional group, e.g., alkylene of 1–4 carbon atoms, e.g., diethyl ether, di-n-propyl ether, diisopropyl ether and di-n-butyl ether, cyclic ethers, e.g., tetrahydrofuran and dioxane, and polyethers, ethylene glycol dimethyl ether, ethylene glycol diethyl ether, diethylene glycol dimethyl ether, diethylene glycol diethyl ether and triethylene glycol dimethyl ether; and tertiary amines, e.g., trialkylamines, including trimethylamine, triethylamine, dialkyldiamines, including N,N,N',N' - tetramethylethylenediamine, heterocyclic amines, including N-methyl morpholine, N-ethyl morpholine, and arylamines, including N-phenyl morpholine. Also suitable are dialkyl and diaryl sulfides wherein alkyl and aryl are as defined above and non-functionally reactive phosphorous compounds, e.g., hexamethyl phosphoric acid triamide.

Difunctional Lewis bases, such as, for example, 1,2-dimethoxyethane and N,N,N',N' - tetramethylethylenediamine, exhibit a substantially higher effectiveness than monofunctional Lewis bases, such as, for example, tetrahydrofuran or triethylamine.

A single Lewis base or a mixture thereof can be employed. The amount of Lewis base employed can vary widely, e.g., 0.01–10% by weight, preferably 0.05–5% by weight, based on the butadiene.

The weight ratio of Lewis base to organolithium compound in the catalyst system also can vary widely, e.g., 0.1:1 to 1,000:1, preferably 1:1 to 250:1.

The polymerization is conducted in an inert organic diluent, preferably an aliphatic or aromatic hydrocarbon, such as, for example, propane, iso- and n-butane, iso- and n-pentane, iso- and n-hexane, iso- and n-heptane, iso- and n-octane; cyclobutane, cyclopentane, cyclohexane, cycloheptane and cyclooctane; benzene, toluene, o-, m-, and p-xylene and ethylbenzene. The diluent can be employed in pure form or in the form of a mixture of one or more compounds.

The polymerization according to this invention can be initiated at starting temperatures ($T_A$) of 30–100° C., preferably below 90° C., e.g., 60° C. Starting temperatures below 30° C. are not practical because the polymerization rate would be too low. The temperature gradient increase ($\Delta T$) through which the polymerization proceeds is 30–125° C., preferably at least 50° C., e.g., 66° C. The final temperature, i.e., the sum of the starting temperature ($T_A$) and the temperature gradient ($\Delta T$), must not exceed 155° C. because polymerization temperatures above 155° C. do not produce the polymers of the present invention.

The polybutadienes employed in the tire treads of this invention have an average vinyl group content of 25–50%, preferably 30–45%, a cis-1,4-double bond content of 10–40%, a trans-1,4-double bond content of 15–55%, a Mooney viscosity (ML-4) of between 40 and 120 and a deformation-elasticity of 25, preferably 30–45.

As stated above, the vulcanizable compositions of this invention consist essentially of:

(a) A butadiene homopolymer as defined herein;
(b) 5–100 parts by weight of a plasticizer, based on 100 parts by weight of polybutadiene; and
(c) 30–120 parts by weight of a carbon black, based on 100 parts by weight of polybutadiene.

These compositions contain 70–30%, preferably 60–35%, especially 40–50% by weight of the composition of the polybutadiene homopolymer.

Beside the advantages obtained in the processing technique in connection with these polybutadienes according to this invention, an additional advantage resides in the fact that very large amounts of carbon black and plasticizer can be employed.

Suitable plasticizers are all aliphatic or aromatic oils customarily employed in the rubber processing art. They are employed in amounts of 5–100 parts by weight, preferably 40–70% parts by weight, based on 100 parts by weight of polybutadiene. The plasticizer is advantageously added while the polybutadiene is still in the solution phase, subsequent to the polymerization.

Suitable fillers are, in particular, highly active carbon black types, such as HAF (high abrasion furnace), ISAF (intermediate super abrasion furnace) and SAF (super abrasion furnace), alone or in combination with light colored fillers. They are employed in amounts of 30–120 parts by weight, especially 70–100 parts by weight, based on 100 parts by weight of polybutadiene. In this connection, the quantities of filler and plasticizer employed should be reasonably related to each other. Good processing properties are always obtained at a filler-plasticizer ratio of 1.2:1 to 10:1, although higher and lower ratios are operable.

In a particularly advantageous embodiment of the present invention, in addition to components (a), (b) and (c), the vulcanization composition contains, as an additional component, (d) 1–3 parts by weight of sulfur and 0.5–2.5 parts by weight of mercaptobenzothiazole or a derivative thereof, especially a sulfenamide thereof.

In addition thereto, basic secondary accelerators can be employed.

For the manufacture of tire treads, the polybutadienes employed according to this invention are homogeneously mixed with the required amounts of plasticizer or oil, under conditions which are as gentle as possible, in accordance with conventional methods. Then, they are extruded into tire tread strips, after the addition of customary rubber adjuvants, again employing conventional processes and devices. These unvulcanized tread strips are thereafter vulcanized in conventional presses, together with the tire components customary in the tire manufacturing art, such as sidewalls and carcasses.

An especially urgent technical need, viz, reducing the high incidence of problems which arise during the production of rubber blends, which is customary, is satisfied by the use in the manufacture of vulcanizable compositions, especially those intended for the production of tire treads and particularly those employed in the manufacture of automobile tires, comprising stereoregular butadiene homopolymers having an average content of vinyl groups of 25–50%, preferably 30–45%, as well as a proportion of long-chain branchings increased in accordance with the deformation-elasticity.

These polybutadienes employed in accordance with the invention exhibit a considerably improved processability and a strongly increased extrusion capacity in a mixture with high amounts of plasticizers and carbon black, not only compared with conventional polybutadienes having a high cis-1,4-content, but also as compared to the known polybutadienes, produced under conventional conditions using lithium catalysts, which have a high vinyl group content. Moreover, they result in tire treads having good non-skid properties on a wet road surface as well as a high abrasion resistance and other rubber-technological properties satisfying the other requirements which must be met by automobile tires.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In order to show the surprising advantages of the present invention, the properties of the polybutadienes of this invention (rubber types D and E) are compared to those of conventional rubber types (rubber types or mixtures A, B, and C, and/or F).

(1) Definition and production of the rubbers

Rubber A is a blend of 60 parts by weight of an oil-extended butadiene-styrene copolymer (type: SBR 1712 [1]) and 40 parts by weight of an oil-extended cis-1,4-polybutadiene (type: 1252 [1]), containing 37.5 parts by weight of an oil extender, based on the elastomer.

Rubber B is a copolymer of butadiene and styrene having the following microstructure: 37% trans-1,4 units, 34% cis-1,4 units, 9% 1,2-(vinyl) units and 20% styrene units. This rubber is produced as follows:

Into two reactors (stirrer autoclaves), with the exclusion of air and moisture, a mixture is introduced of 80 parts by weight of hexane, 16 parts by weight of 1,3-butadiene, and 4 parts by weight of styrene. The reaction mixture is distributed between the two reactors so that one reactor contains one-third and the other reactor contains two-thirds of the mixture. After removing the impurities ---
[1] IISRP nomenclature—IISRP-International Institute of Synthetic Rubber Producers.

with butyllithium, 0.3 part by weight of butyllithium (active catalyst), based on the total amount of the monomer, is introduced into the reactor containing one-third of the mixture. Within three hours, the content of the other reactor is thereupon transferred into the first reactor. By cooling the latter, a temperature of 49° C. is maintained during the entire reaction period. After a total of 4 hours, the reaction is complete. The ML-4 of the rubber present in the solution is 97. The proportion of styrene incorporated in a block-type fashion is 2.5%. The gel content is below 2%.

Rubber C is a homopolymer of butadiene having the following microstructure: 40% trans-1,4 units, 27% cis-1,4 units, and 33% 1,2 units. The proportion of butadiene units disposed in the 1,2-position (vinyl groups) is "symmetrically" distributed uniformly along the polymer chain.

This rubber is produced as follows:

A stirrer autoclave is filled, with careful exclusion of air and moisture, with 80 parts by weight of hexane, 20 parts by weight of 1,3-butadiene, and 0.5 part by weight of tetrahydrofuran, based on the butadiene. After heating the mixture to 49° C., 0.025% by weight of n-butyllithium (active catalyst) is added, based on the butadiene. By subsequent cooling, the preselected temperature of 49° C. is maintained. After a total of 4 hours of reaction time at this temperature, the reaction is terminated. The ML-4 value of the rubber in the solution is 98. Gel content is below 2%.

Rubber D is a homopolymer of butadiene with the following microstructure: 41% trans-1,4 units, 27% cis-1,4 units and 32% 1,2-(vinyl) units.

The 32% butadiene units arranged in the 1,2-position (vinyl groups) is an average value, since the distribution of the vinyl groups along the individual longitudinal axis of the macromolecule varies substantially and decreasingly toward the ends thereof.

This rubber is produced as follows:

A stirrer autoclave having a capacity of 150 liters is charged, with the exclusion of air and moisture, with a total of 65 kg. of a mixture of 80 parts by weight of hexane, 20 parts by weight of 1,3-butadiene, and 2 parts by weight of tetrahydrofuran, based on the butadiene.

After heating the solution to the starting temperature of 60° C., 0.028% by weight of n-butyllithium (active catalyst) is added, based on the butadiene. The reaction temperature is permitted to rise without cooling.

After surpassing the peak temperature of 126° C., the reaction is terminated. Thereafter, the reaction mixture is cooled. The ML-4 value of the rubber present in the solution is 97. Gel content is below 2%.

The experiment was repeated five times with exactly the same results.

Rubber E is a homopolymer of butadiene having the following microstructure: 34% trans-1,4 units, 21% cis-1,4 units and 45% 1,2 (vinyl) units.

The 45% butadiene units arranged in the 1,2-position (vinyl groups) is an average value, since the distribution of vinyl groups along the individual longitudinal axes of the macromolecule varies substantially and decreasingly toward the ends thereof.

This rubber is produced as follows:

A stirrer autoclave having a capacity of 150 liters is filled, with the exclusion of air and moisture, with a total of 65 kg. of a mixture of 85 parts by weight of hexane, 15 parts by weight of 1,3-butadiene and 0.3 part by weight of 1,2-dimethoxyethane. After heating the solution to the starting temperature of 55° C., 0.03% by weight of n-butyllithium (active catalyst) is added, based on butadiene. The reaction temperature rises to a peak of 110° C. After passing the temperature peak, the reaction is terminated and the reaction mixture is cooled. The ML-4 value of the rubber present in the solution is 66. Gel content is below 2%.

The experiment was repeated five times with exactly the same results.

Rubber F is a blend analogous to Rubber A consisting of 80 parts by weight of an oil-extended butadiene-styrene copolymer (type: SBR 1712[2]) and 20 parts by weight of an oil-extended cis-1,4-polybutadiene (type: 1252 [2]) containing 37.5 parts by weight oil extender, based on the elastomer.

(2) Production of rubber-oil mixtures

To solutions of the rubbers B, C, D and E prepared in accordance with (1) are added, respectively, 37.5 parts by weight, based on the solid rubber content, of a mineral oil plasticizer having a high aromatics content, and 1.0% of a color-inhibiting stabilizer. The reaction mixture is worked up by separating the solvent with steam. The dewatering step is thereafter conducted by subsequent squeezing in screw extruders, as well as drying of the crumbs on a plate conveyor.

The viscosities of the thus-obtained rubber-oil mixtures are compiled in Table 1, column (b).

(3) Production of tire tread mixture and tire tread strip

In an internal mixer (model GK 100), the following mixture is prepared at a charging weight of 135 kg. and a speed of the front rotor of 30 r.p.m.

| | Parts by weight |
|---|---|
| Oil-extended rubber | 137.5 |
| Coumarone resin | 3.0 |
| Zinc oxide | 3.0 |
| Stearic acid | 2.0 |
| Phenyl-$\beta$-naphthylamine | 1.5 |
| ISAF carbon black | 85.0 |
| Aromatic plasticizer oil | 15.0 |
| Mercaptobenzothiazole sulfenamide | 1.5 |

The necessary mixing time for obtaining a homogeneous mixture, i.e., up to the optimum of the energy absorption, as well as the plasticity values of the mixtures thus-obtained can be seen for the individual rubber types from columns (c) and (d) of Table 1.

After 12 hours of storage time, 2 parts by weight of sulfur, based on the solid rubber, are mixed with each of the mixtures in a masticator GK 100 at a charging weight of 130 kg. and a speed of 20 r.p.m., within a time period of 2 minutes. The thus-obtained values of plasticity can be seen from column (e) of Table 1.

After another storage period of 12 hours, one protector PS-4 (DIN 7751) is produced with the aid of an extruder (model Troester; screw diameter: 200 mm.; length: 4 d. (diameters)) at a speed of 35 r.p.m. The heating is controlled in such a manner that a temperature of the material of 100-120° C. results. The outcome of the extrusion capacity is set forth in column (f) of Table 1.

The superiority of the polybutadienes employed in the production of vulcanizable rubber compositions of this invention (D and E) is clearly seen.

(4) Production of tires (vulcanization) and tire test

In order to determine the properties of the vulcanizate, a stepwise heating procedure is conducted with the mixtures obtained according to (3) (10, 20, 30 and 40 minutes at 151° C.). The results are compiled in Table 2.

The results of Table 2 demonstrate that the polybutadienes of this invention and the mixtures thereof, in addition to the aforedescribed advantages from a manufacturing point of view, are fully equivalent, with respect to the property combination of abrasion resistance/skid resistance, to the conventional rubbers or mixtures thereof.

The thus-obtained raw tread strips are applied to preformed tire carcasses having the tire dimensions 6.40-13, in accordance with conventional methods by laying and rolling. Thereafter, in a tire heater (Bag-O-Matic) of a suitable form, the tires are vulcanized within a time period of 20 minutes at a mold temperature of 180° C. employing a heating bellows temperature of 190° C.

[2] IISRP nomenclature.

The tire test was conducted under the following conditions:

| | |
|---|---|
| Vehicle | Ford 20 M/TS. |
| Road | Highway and turnpike in approximately the same ratio. |
| Length of test | 12,000 km. |
| Load on vehicle, including driver | 400 kg. |
| Average speed | 95 km./h. |

The results are set forth in Table 3.

The results of Table 3 demonstrate that the butadiene polymers employed in the compositions of this invention, in addition to the aforedescribed advantages from a manufacturing point of view, are equivalent as tire rubbers compared with special tire rubbers or blends thereof conventionally employed. In this regard, the minor differences are within the limit of measurement variations.

TABLE 1

| | (a) | Rubber-oil mixtures (b) | (c) | Tire mixtures (d) | | (e) | | (f) |
|---|---|---|---|---|---|---|---|---|
| Rubber | Plasticity ML-4 / Defo* H/E | Plasticity ML-4 | Defo* H/E | Mixing time (optimum of energy absorption) (min.) | Plasticity of the Basic Mixture ML-4 / Defo* H/E | Plasticity finished mixture ML-4 / Defo* H/E | | Extrusion capacity (m./min.) |
| A | | 40 | 600/37 | 4.5 | 104 | 2,750/34 | 73 | 1,850/25 | 14.2 |
| B | 97 1,750/36 | 46 | 600/29 | 4.0 | 94 | 2,200/22 | 84 | 1,900/16 | 13.8 |
| C | 98 1,700/18 | 45 | 580/13 | 4.5 | 98 | 2,250/9 | 89 | 1,900/7 | 11.9 |
| D | 97 1,800/39 | 47 | 540/30 | 4.0 | 101 | 2,350/23 | 91 | 2,150/19 | 16.1 |
| E | 66 1,200/32 | 32 | 380/26 | 3.5 | 86 | 2,000/20 | 75 | 1,800/18 | 15.9 |
| F | | 50 | 650/36 | 4.2 | 99 | 2,500/36 | 75 | 1,800/21 | 14.5 |

NOTE.—Defo* according to DIN 53 514.

| Rubber | Tensil strength, kg./cm.² | Elongation, percent | Modulus, 300% | Hardness, Shore | Elasticity 22° C. | Elasticity 75° C. | Abrasion DIN | Abrasion Pico | Skid-resistance concrete, wet |
|---|---|---|---|---|---|---|---|---|---|
| A | 153 | 655 | 63 | 60 | 28 | 42 | | | |
| | 157 | 530 | 75 | 62 | 28 | 43 | 102 | 20 | 45 |
| | 154 | 525 | 77 | 63 | 28 | 43 | 98 | 21 | 44 |
| | 159 | 515 | 77 | 61 | 28 | 43 | | | |
| B | 168 | 675 | 56 | 60 | 29 | 38 | | | |
| | 167 | 665 | 63 | 60 | 28 | 37 | 105 | 19 | 43 |
| | 175 | 660 | 65 | 60 | 29 | 37 | 102 | 21 | 44 |
| | 170 | 635 | 65 | 60 | 29 | 37 | | | |
| C | 140 | 670 | 49 | 58 | 30 | 37 | | | |
| | 137 | 550 | 63 | 60 | 32 | 39 | 100 | 21 | 45 |
| | 140 | 545 | 67 | 60 | 32 | 39 | 97 | 19 | 45 |
| | 139 | 495 | 67 | 60 | 32 | 40 | | | |
| D | 145 | 680 | 50 | 60 | 30 | 37 | | | |
| | 148 | 540 | 64 | 60 | 31 | 39 | 104 | 20 | 44 |
| | 141 | 545 | 67 | 60 | 32 | 39 | 99 | 21 | 45 |
| | 148 | 520 | 68 | 60 | 32 | 39 | | | |
| E | 145 | 685 | 49 | 60 | 29 | 37 | | | |
| | 135 | 580 | 63 | 59 | 30 | 38 | 120 | 25 | 51 |
| | 138 | 584 | 65 | 60 | 31 | 38 | 122 | 26 | 52 |
| | 140 | 601 | 67 | 60 | 30 | 38 | | | |
| F | 115 | 690 | 51 | 50 | 25 | 40 | | | |
| | 180 | 581 | 72 | 59 | 27 | 41 | 123 | 25 | 52 |
| | 181 | 592 | 75 | 60 | 27 | 41 | 125 | 26 | 53 |
| | 193 | 595 | 75 | 60 | 27 | 41 | | | |

TABLE 3

Index (higher values mean less abrasion)

| | |
|---|---|
| Rubber A | 100 |
| Rubber B | 98 |
| Rubber C | 98 |
| Rubber D | 102 |
| Rubber E | 86 |
| Rubber F | 85 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A vulcanizable polybutadiene composition suitable for use in tire tread strips production consisting essentially of:
    (a) a polybutadiene homopolymer having an average vinyl group content of 25–50%, the distribution of which vinyl groups varies substantially constantly and decreasingly along the longitudinal axis of the macromolecule toward an end thereof, 10–40% cis-1,4-units, 15–55% trans-1,4-units, a Mooney viscosity (ML-4) of between 40 and 120, and deformation-elasticity of at least 25;
    (b) 5–100 parts by weight of a plasticizer, based on 100 parts by weight of polybutadiene; and
    (c) 30–120 parts by weight of a carbon black, based on 100 parts by weight of polybutadiene.

2. A composition according to claim 1 wherein the polybutadiene homopolymer has a vinyl group content of 25–50%, 30–45% cis-1,4-units and a deformation-elasticity of 30–45.

3. A composition according to claim 1 containing 70–30% by weight of the polybutadiene homopolymer.

4. A composition according to claim 1 containing 70–100 parts by weight of the plasticizer, based on 100 parts of the polybutadiene.

5. A composition according to claim 1 containing 70–100 parts by weight of carbon black, based on 100 parts of the polybutadiene.

6. A composition according to claim 2 containing 40–50% by weight of the polybutadiene homopolymer, containing 70–100 parts by weight of the plasticizer, based on 100 parts of the polybutadiene and containing 70–100 parts by weight of carbon black, based on 100 parts by weight of the polybutadiene.

7. A composition according to claim 1 shaped into tire tread strip form.

8. A composition according to claim 6 shaped into tire tread strip form.

9. An automobile tire whose tread portion is formed of a vulcanizate of a composition of claim 1.

10. An automobile tire whose tread portion is formed of a vulcanizate of a composition of claim 6.

11. A composition according to claim 1, containing as additional components, 1–3 parts by weight of sulfur and 0.5–2.5 parts by weight of mercaptobenzothiazole or a derivative thereof.

12. A composition according to claim 11 wherein the polybutadiene homopolymer has a vinyl group content of 25–50%, 30–45% cis-1,4-units and a deformation-elasticity of 30–45.

13. A composition according to claim 12 containing 40–50% by weight of the polybutadiene homopolymer, containing 70–100 parts by weight of the plasticizer, based on 100 parts of the polybutadiene and containing 70–100 parts by weight of carbon black, based on 100 parts of the polybutadiene.

14. A composition according to claim 12 shaped into tire tread strip form.

15. A composition according to claim 13 shaped into tire tread strip form.

References Cited

UNITED STATES PATENTS

| | | | |
|---|---|---|---|
| 3,301,840 | 1/1967 | Zelinski | 260—94.2 |
| 3,363,659 | 1/1968 | Keckler | 152—336 |
| 3,373,132 | 4/1968 | Sutter | 260—33.6 |
| 3,305,516 | 2/1967 | Smith | 260—33.6 |
| 3,451,988 | 6/1969 | Langer | 260—94.6 |
| 3,417,044 | 12/1968 | Ross et al. | 260—33.6 |

ALLAN LIEBERMAN, Primary Examiner

R. ZAITLEN, Assistant Examiner

U.S. Cl. X.R.

260—41.5 R, 330

UNITED STATES PATENT OFFICE
CERTIFICATE OF CORRECTION

Patent No. 3,741,927                     Dated  June 26, 1973

Inventor(s)    KARL-HEINZ NORDSIEK ET AL

It is certified that error appears in the above-identified patent and that said Letters Patent are hereby corrected as shown below:

Column 1, line 10 of the "Background of the Invention":

"0.20" should be -- 80:20 --.

Signed and sealed this 9th day of April 1974.

(SEAL)
Attest:

EDWARD M. FLETCHER, JR.                   C. MARSHALL DANN
Attesting Officer                         Commissioner of Patents